Figure 1:
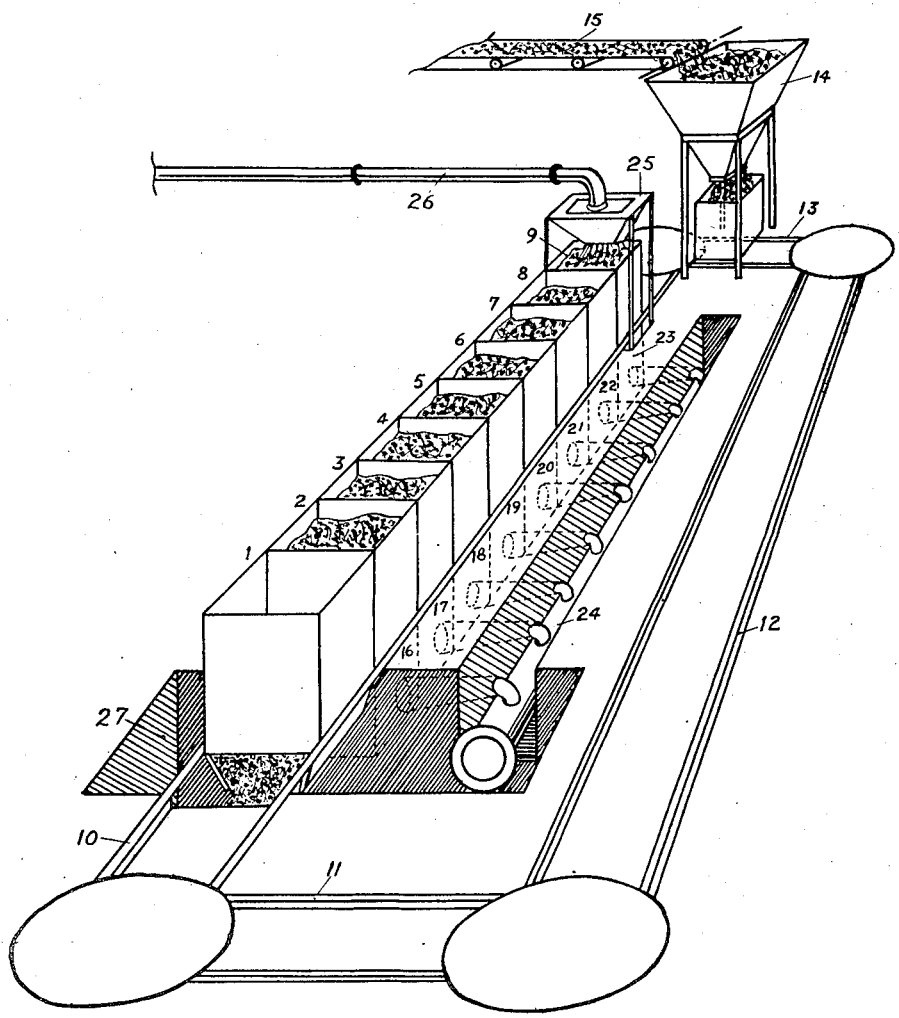

Oct. 6, 1953   F. P. SOMOGYI   2,654,588
HEAT-TREATMENT OF MATERIALS
Filed April 26, 1950   3 Sheets-Sheet 2

Inventor
Francis Paul Somogyi,
by *Lothar Michaelis*
His Attorney

Oct. 6, 1953  F. P. SOMOGYI  2,654,588
HEAT-TREATMENT OF MATERIALS
Filed April 26, 1950  3 Sheets-Sheet 3

Inventor
Francis Paul Somogyi,
by *Lothar Michaelis*
His Attorney

Patented Oct. 6, 1953

2,654,588

UNITED STATES PATENT OFFICE 2,654,588

HEAT-TREATMENT OF MATERIALS

Francis Paul Somogyi, London, England

Application April 26, 1950, Serial No. 158,107
In Great Britain January 6, 1950

24 Claims. (Cl. 263—28)

The present invention relates to the heat-treatment e. g. burning, sintering, calcining and drying of materials, and particularly to the burning of cement raw material in vertical shaft kilns.

Although modern shaft kilns of the continuous type have proved to operate more economically than the rotary kilns, it has been difficult to obtain at all times clinker of equal quality.

In modern shaft kilns the cement raw material together with the required solid fuel is supplied continuously at the top of the shaft whilst burnt clinker is drawn continuously at the bottom so that the material is kept moving downwards through the shaft; at the same time fresh air is blown in at the bottom of the shaft and passes upwards in counter-current to the material. In such shaft furnaces at least three zones can be distinguished, the first and upper zone, in which the material is pre-heated by the escaping combustion gases, the second and middle zone, in which the burning takes place, and the third and lower zone in which the material is cooled by the ascending stream of fresh air. Theoretically the depth of each zone could be kept very small, and the shaft of the kiln need not be built higher than about 3 metres; actually, however, conventional shaft kilns are built to a height of about 10 metres.

The reason for the provision of such high shaft kilns is to be seen in the fact that it is difficult to control the movement of the material downwards through the shaft and to avoid that the material moves downwards in some section of the shaft with greater speed than in other sections; sometimes it even happens that some nodules or briquettes make their way through the shaft so quickly that they arrive almost unburnt at the bottom. Therefore, in order to make it certain as far as possible that also the quicker moving parts of the charge are properly burned, it has become necessary to provide very deep zones for the pre-heating, heat-treating and cooling of the material; it is obvious that, even if the boundaries between the zones should move upwards or downwards in some sections of the kiln as a result of an uneven flow of the material, by the provision of deep zones it is ensured that practically all the material has been subjected for a sufficient length of time to the necessary heat-treatment.

The requirement of such deep zones and the resulting necessity to build high shaft kilns causes additional difficulties. In order to be able to blow the combustion air through these kilns at an economical pressure, the kilns have to be loaded with nodules or briquettes of a substantial size, usually the size of a normal brick, in order to provide sufficient interspaces for the passage of the gases. However, large size nodules and briquettes require a longer time for burning through and are the cause of a high fuel consumption.

Now, according to the present invention, it is suggested for the heat-treatment, e. g. for the burning, sintering, calcining or the like, of materials, particularly of cement raw materials mixed with solid fuel, to use a vertical kiln of a height not exceeding about 4 metres, to load this kiln with the materials to be treated in the form of shapes, briquettes or granules of a small size, to subject the material to the heat-treatment whilst stationary in the kiln, and to draw the whole charge after the burning has been completed; it is further suggested to cause the air to move through the kiln by suction and preferably in a downward direction.

As the charge within the kiln is stationary it is ensured that all parts of the charge are subjected to the same extent to the required heat-treatment with the result that the charge is evenly burnt and clinker of equal quality is obtained. Accordingly, the deep zones, characteristic of the kilns now in general use, are not necessary any longer and the height of the kiln may be reduced from the usual height of 10 metres to about 4 metres, and even much below this size, the lower limit being of the order of about 1 metre. In fact, the actual height will depend mainly upon the size of the granules or briquettes. In contra-distinction to the known high shaft furnaces, which, due to the great height require nodules or briquettes of considerable size, nodules for the 4 metre kiln according to the invention may have a diameter of only about 30 mm; and with kilns of smaller height the nodules or briquettes may have a still considerably smaller size. From this it follows that by the above mentioned "small size" shapes or briquettes are meant such which have a diameter smaller than 30 mm.

Although considerable advantages over the arrangements known hitherto can be obtained with shaft furnaces of about 3 or 4 metres and with nodules of 30 mm. diameter, calculations and tests have proved that so far the most satisfactory conditions can be secured with shaft furnaces having a height of about 1½ metres loaded with nodules of about 10 mm. in size.

In order to secure a continuous operation, it is further proposed to provide a battery of the new type of kilns and to operate them in cycles with displaced phases, so that for instance, at a certain time there is one kiln which is loaded, another kiln or other kilns in which the charge is burnt and finally a kiln from which the clinker is drawn. It is advantageous to insert into the cycle also kilns in which the loaded raw material is pre-heated and further kilns wherein the burnt material is cooled before discharging. Instead of one kiln naturally two or more kilns may be used in which the same phase of the cycle can take place. In this way it is made possible to operate continuously the new type of shaft kiln.

Figure 2:
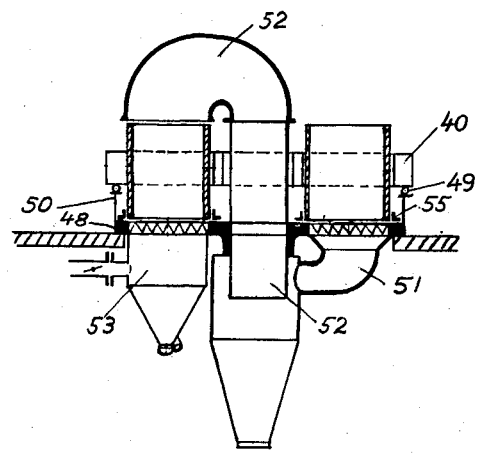
Figure 3:
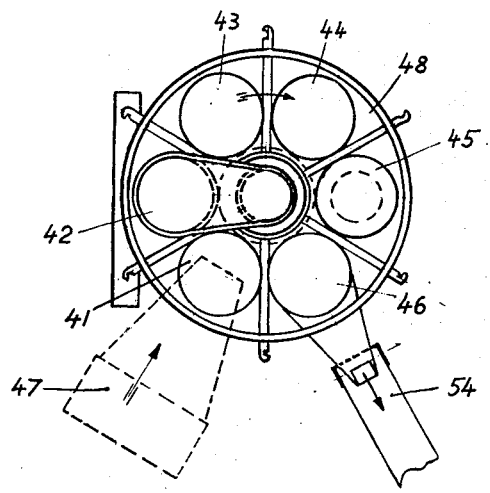
Figure 4:
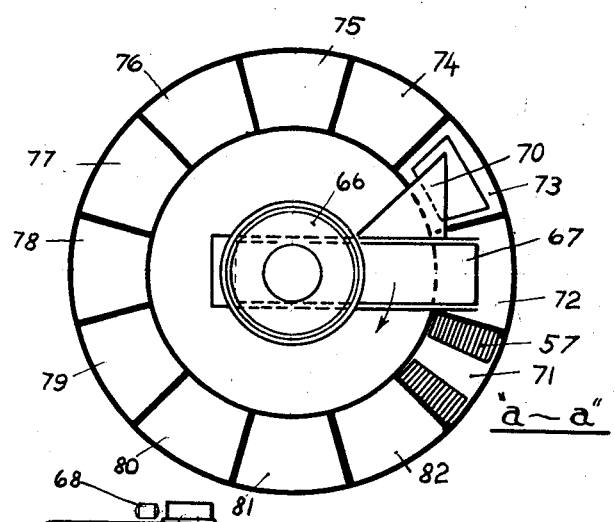
Figure 5:
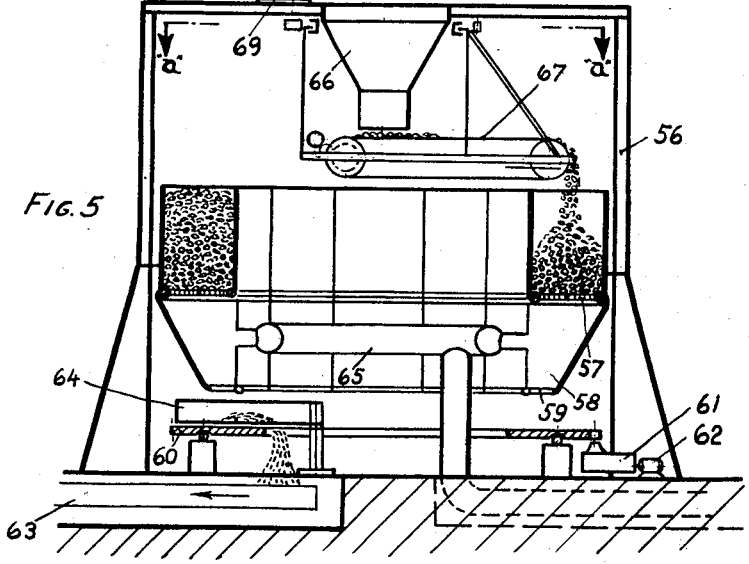

Further features and advantages of the new method for the heat-treatment of materials will become apparent from the following description of some arrangements for carrying out the new method with reference to the accompanying drawings, wherein Fig. 1 represents a perspective view of a battery with moveable kilns according to the invention, Figs. 2 and 3 show a cross-section and a plan view of another arrangement for a moveable kiln battery, and Figs. 4 and 5 show a plan view and a longitudinal section of an arrangement representing the application of the invention to a stationary battery of kilns.

As can be seen from Fig. 1 a battery of ten kilns is provided, nine of them are in the positions marked with numerals 1, 2, 3, ... 9. These kilns have the form of cubes about 2 metres high, which are open at the top and provided at the bottom with a grate, connected to the kiln by a hinge or the like, so that it can be swung out when the kiln has to be emptied. Each kiln is mounted on wheels or rollers so that it can be moved on corresponding rails, which form in the represented example an elongated rectangle, but can also be arranged to form a circle or any other closed figure. At each corner of the rectangle a turn-table is provided so that the kiln in position 1 at the forward end of the long side 10 can be moved over the short side 11, the parallel long side 12, and over the opposite short side 13 to the rear end of the long side 10 of the rail rectangle.

In the range of the short side 13 of the rail rectangle a loading device is provided comprising a hopper 14 and a supply conveyor 15 for the raw material, the arrangement being such that when an empty kiln arrives underneath the hopper, the loading of the kiln with the raw material can be performed. The loaded kiln is then moved into the position of the kiln 9 on the long side 10 of the rail rectangle, which position has become vacant by shifting each kiln into the next following operational position after removal of the kiln which has been emptied in the kiln position 1.

Along the side 10 of the rectangle, which may be called hereafter the operational side, the burning of the raw material takes place. Underneath each kiln in their operational positions 2-9, boxes 16-23 are provided, adapted to be connected in an air-tight manner to the bottom of the kiln. From each box a pipe leads to the manifold 24 which is connected to an air pump (not shown).

In the kiln position 9, that is above the first kiln of the battery, an ignition device 25 is provided, to which fuel, e. g. gas, is supplied by the tube 26.

At the opposite end of the battery underneath the first fliln, a groove 27 is arranged which is provided with means adapted to receive the burnt clinker which then is transported, by suitable coveying means (not shown), to other parts of the plant for further treatment.

In operation fresh air is drawn by the air pump by means of manifold 24 and the suction boxes 16-23 through the kilns in the operational positions 2-9, which are filled with material to be treated. The burning process is initiated by the ignition device 25 in the first kiln (position 9), and the arrangement is such that when this kiln reaches the kiln position 2 the burning zone has reached the bottom of the kiln and the burning of the whole charge of this particular kiln is completed. As burning takes place in eight kilns in the illustrated example, the burning zone moves downwards one eighth of the height of the kiln in each operational position.

The completion of the burning process can be indicated by a thermo-couple and the operator can then cause the whole battery to move so far that each kiln arrives in the position of the preceding kiln; naturally, the impulse from the thermo-couple can also be used to act upon devices which automatically impart the required movement to the kilns.

By each shifting movement, one kiln from position 2, in which the burning process has been completed, reaches the position 1 above the discharge groove 27, so that the burnt clinker can be drawn and the empty kiln then moved back to the loading station.

In this way a continuous and automatic operation is ensured, which allows with the minimum of labour to produce any required output of perfectly burned clinker.

According to the construction illustrated in Figs. 2 and 3 the kilns are arranged in a horizontal circle. As can be seen, six kilns, which may have a height of 1½ metres and about the same diameter, are suspended in a structure carried by an outer ring 40 which is adapted to revolve around its own axis on rollers 49 which are supported by rails 50. A drive is provided (not shown) suited to move the kilns step by step through the operational positions 41, 42, ... 46. The kilns are open at the top and at the bottom, and they slide along a stationary solid base plate 48, which is provided in the operational stations 42 to 46 with circular apertures having the same diameter as the openings of the kilns. The mentioned apertures are provided with a grate in the operational positions 42 to 45, whilst the aperture in position 46, through which the discharge takes place, remains open. Artificial cooling may be provided for the grate in the operational position 45 where the burning zone has reached the bottom of the kiln. The kilns may be surrounded at their lower end with a short ring 55 with a flange which is free to move in an axial direction and glides along the base plate 48 and thus seals the gap between the lower edge of the kiln and the base plate.

The kiln which is in the position 41 is loaded by means of a loading device 47, the material resting upon the base plate 48. At the same time the kiln in the preceding station 46 is discharged through the opening in the base plate and the burnt clinker is removed by a conveyor device 54.

In kiln position 42 provision is made for preheating the material. To this end fresh air is drawn through the kiln in position 45, in which the burning has just been completed, the air then passes through the suction box 51, pipe 52, and further through the kiln in position 42 and through the suction box 53 underneath the grate in position 42, and flows finally to the pump (not shown) connected to the suction box 53 by a pipe. It is advantageous to insert between the suction box 51 and the pipe 52 a separator for the separation of any particles carried by the gas stream. The tube 52 is enlarged at its upper end and bent downwards to form a hood, the opening of which registers with the opening of the kiln in position 42. Also the suction box 53 in position 42 may be provided with a separator as shown.

The air drawn through the kiln in position 45 reaches a very high temperature and heats on its passage through the kiln in position 42 the raw material in this kiln to such an extent that the ignition temperature is reached and the burning process initiated as soon as the gases leaving the kiln in position 45 contain enough oxygen. On the other hand by the fresh air passing through the kiln 45 in which the burning has been completed, an effective cooling of the clinker is obtained which considerably improves the quality of the cement.

For starting the operation it is suggested to provide burner (not shown) for heating the air which enters the kiln in position 42. This burner may be mounted in an aperture provided in the walls of the tube 52, and gaseous, liquid or pulverulent fuel may be used for operating the burner. However, this burner may also be used during normal operations in all those cases where the material to be treated is charged into the kiln with a reduced amount of fuel or entirely without fuel. Such cases may occur where the nature of the material or the heat treatment process make the use of solid fuel not advisable.

In the positions 43 and 44 fresh air is drawn through the kilns in a similar way and by similar means as described in connection with the arrangement according to Fig. 1; to this end suction boxes are arranged underneath the grates in positions 43 and 44 which are connected to an air pump drawing fresh combustion air through the kilns.

The working conditions are chosen such that the burning zone moves about half the length of the kiln while the kiln is in position 43, and that the burning zone reaches the bottom of the kiln when the kiln is in position 44. In the next position 45, in which the burning is completed, fresh air is drawn through the kiln which serves, as has been explained, for pre-heating the material in kiln position 42. Thus an advantageous cooling of the clinker is obtained before its discharge in the following position 46.

If a higher degree of pre-heating in kiln position 42 is desired, it is advantageous to adjust the burning process in such a manner that the burning is not entirely completed in position 44 and that the lowest part of the charge is subjected to the burning process in kiln position 45. In this case it may be advantageous, but not necessary, to provide between positions 45 and 46 another station, in which the material is further cooled by means of fresh air drawn through the kiln.

In this way a very compact cement making machine is obtained, which is suited to produce any desired quantity of properly burnt clinker.

While according to the arrangement so far described the kilns move from one operational station to the next following operational station, Figs. 4 and 5 illustrate an arrangement with stationary kilns. On a scaffolding 56, twelve kilns are supported, each kiln is provided with a hinged grate 57 which can be swung open when the kiln has to be discharged. Underneath each kiln a box 58 is provided into which the grate opens. The bottom opening of each box 58 is provided with a hinged door 59 which is opened when the clinker is drawn. Beneath box 58 an annular disc 60 is provided adapted to receive the burnt clinker discharged from the kilns. This annular disc is rotatably mounted and caused to revolve by gearing 61 and motor 62. In the range of a conveyor 63 a scraper 64 is provided, which scrapes off the material from the annular disc so that it falls upon the conveyor 63 which carries the burnt clinker to further processing devices.

Each box 58 serves at the same time as suction box to draw the combustion air through the kiln. To this end each box 58 is connected by a suitable branch pipe to a manifold 65, leading to an air pump (not shown) which causes the air to flow through the kilns.

For the loading of the kilns a hopper 66 is suspended in the scaffolding centrally in respect of the kilns. Underneath the central discharge opening of the hopper a conveyor 67 is arranged which carries the raw material radially outwards to the kilns. The conveyor 67 is rotatably suspended on the scaffolding 56 so that it can be intermittently rotated from one kiln to the next following kiln, this movement being imparted to the conveyor 67 by a motor 68 and gearing 69. The structure on which the conveyor 67 is suspended also carries an ignition device 70 for initiating the burning process.

Now, in operation, while one kiln—in the illustration the kiln 71—is discharged, another kiln 72 is loaded, and a third kiln 73 is ignited, in the remaining kilns 74—82 the burning takes place. After the drawing, loading and igniting has been completed the conveyor 67 and the ignition device 70 move into the next position so that the loaded kiln 72 can be ignited and the empty kiln 71 loaded; at the same time the kiln 82 in which the burning has been completed, is discharged.

Instead of the ignition apparatus 70 a channel can be provided which has such a form that one opening registers with the opening of the kiln wherein the burning has been completed, e. g. kiln 82, and the other opening coincides with the opening of the kiln which has just been loaded, e. g. kiln 73. In this way air could be blown from below into the kiln 82 which, while cooling the clinker, would obtain a high temperature, and this hot air could then be drawn through the kiln 73 in order to pre-heat the raw material in a similar way as described in connection with the arrangement illustrated in Figs. 2 and 3. This pre-heating channel would rotate together with the loading conveyor 67.

It is self understood that it is possible to initiate and to control all the operations automatically in dependence upon the position of the burning zone in the kilns.

By the described new method for the burning of cement, which may also be applied to the heat treatment of any other material, e. g. lime burning, the output in respect of a unit volume of the kiln space, can be increased many times compared with the output of the rotary kiln or of a modern shaft kiln. Accordingly the space requirements for the whole plant are considerably reduced, and the first costs are correspondingly lower. In addition, also the fuel consumption is smaller, due to the greater surface offered by the small nodules or briquettes and the better interchange of heat between the material and the combustion air. Furthermore, the burning process of the stationary charge can be better controlled so that a properly burnt material of equal quality can be obtained.

What I claim is:

1. An arrangement for the heat-treatment, i. e. burning, sintering, calcining and the like, of raw materials, particularly cement raw material mixed with solid fuel, comprising several vertical kilns of a height not exceeding about 4 metres and intended to be loaded with shapes, briquettes or granules of a small size (as specified), a loading station, one or more heat-treatment stations, in which the heat-treatment is started at the top in timed relationship and the reaction zone gradually progresses downwardly in each kiln until it reaches the bottom of the respective kiln, a drawing station, means adapted to move the kilns along a closed path step by step through said loading station, through the heat-treatment station or stations, through the drawing station and back to the loading station, a hood registering with the upper opening of the kiln in the first station succeeding the loading station, a suction box registering with the lower opening of the kiln in which the reaction zone has progressed to adjacent the bottom of the kiln, and a pipe connected on the one hand to said hood and on the other hand to said suction box.

2. An arrangement for the heat-treatment, i. e. burning, sintering, calcining and the like, of raw materials, particularly cement raw material mixed with solid fuel, comprising several vertical kilns of a height not exceeding about 4 metres and intended to be loaded with shapes, briquettes, or granules of a small size (as specified), the heat-treatment of which is started at the top of the kilns and progresses downwardly therethrough until the reaction zone reaches the bottom of the respective kiln, a loading station, one or more heat-treatment stations, a drawing station, a structure in which the kilns are suspended and which is adapted to move the kilns in a circle stepwise through said loading station, said heat-treatment station or stations, and through said drawing station, and a circular stationary base plate arranged close underneath the lower opening of said suspended kilns, openings in said base plate corresponding with the lower openings of the kilns in the heat-treatment stations and in the drawing station and grates in said openings in the heat-treatment stations.

3. An arrangement for the heat-treatment, i. e. burning, sintering, calcining and the like, of raw materials, particularly cement raw material mixed with solid fuel, comprising several vertical kilns of a height not exceeding about 4 metres, and intended to be loaded with shapes, briquettes, or granules of a small size (as specified), the heat-treatment of which is started at the top of the kilns and progresses downwardly therethrough until the reaction zone reaches the bottom of the respective kiln, a loading station, one or more heat-treatment stations, a drawing station, a structure in which the kilns are suspended and which is adapted to move the kilns in a circle stepwise through said loading station, said heat-treatment station or stations and through said drawing station, a circular stationary base plate arranged close underneath the lower opening of said suspended kilns, openings in said base plate corresponding with the lower openings of the kilns in the heat-treatment stations and in the drawing station and grates in said openings in the heat-treatment stations, a ring surrounding each kiln at the bottom and free to glide on the surface of the kiln in an axial direction, said ring having a flange facing said base plate.

4. An arrangement for the heat-treatment, i. e. burning, sintering, calcining and the like, of raw materials, particularly cement raw material mixed with solid fuel, comprising several vertical kilns of a height not exceeding about 4 metres, and intended to be loaded with shapes, briquettes, or granules of a small size (as specified), the heat-treatment of which is started at the top of the kilns and progresses downwardly therethrough until the reaction zone reaches the bottom of the respective kiln, a loading station, one or more heat-treatment stations, a drawing station, a structure in which the kilns are suspended and which is adapted to move the kilns in a circle stepwise through said loading station, said heat-treatment station or stations, and through said drawing station, a circular stationary base plate arranged close underneath the lower opening of said suspended kilns, openings in said base plate corresponding with the lower openings of the kilns in the heat-treatment stations and in the drawing station and grates in said openings in the heat-treatment stations, a suction box connected to said opening in the base plate in the last heat-treatment station, in which the reaction zone has progressed to adjacent the bottom of the kiln, and a suction box connected to the opening in the base plate in the first heat-treatment station, and a centrally arranged tube extending through an aperture in said base plate and connected with its lower end to said suction box in said last heat-treatment station and forming with its upper end a hood registering with the upper kiln opening in the first heat-treatment station.

5. An arrangement for the heat-treatment, i. e. burning, sintering, calcining and the like, of raw materials, particularly cement raw material mixed with solid fuel, comprising several vertical kilns of a height not exceeding about 4 metres, intended to be loaded with shapes, briquettes or granules of a small size (as specified), the heat-treatment of which is started at the top of the kilns and progresses downwardly therethrough until the reaction zone reaches the bottom of the respective kiln, a loading station, one or more heat-treatment stations, a drawing station, a structure in which the kilns are suspended and which is adapted to move the kilns in a circle stepwise through said loading station, said heat-treatment station or stations, and through said drawing station, a circular stationary base plate arranged close underneath the lower opening of said suspended kilns, openings in said base plate corresponding with the lower openings of the kilns in the heat-treatment stations and in the drawing station and grates in said openings in the heat-treatment stations, a suction box connected to said opening in the base plate in the last heat-treatment station, in which the reaction zone has progressed to adjacent the bottom of the kiln, and a suction box connected to the opening in the base plate in the first heat-treatment station, and a centrally arranged tube extending through an aperture in said base plate and connected with its lower end to said suction box in said last heat-treatment station and forming with its upper end a hood registering with the upper kiln opening in the first heat-treatment station, and a burner for gaseous liquid or pulverised fuel arranged in said connecting tube.

6. An arrangement for the heat-treatment, i. e. burning, sintering, calcining and the like, of raw materials, particularly cement raw material mixed with solid fuel, comprising several vertical kilns of a height not exceeding about 4 metres, and intended to be loaded with shapes, briquettes, or granules of a small size (as specified), the heat-treatment of which is started at the top of the kilns and progresses downwardly therethrough until the reaction zone reaches the bottom of the respective kiln, a loading station, one or more heat-treatment stations, a drawing station, a structure in which the kilns are suspended and which is adapted to move the kilns in a circle stepwise through said loading station, said heat-treatment station or stations, and through said drawing station, a circular stationary base plate arranged close underneath the lower opening of said suspended kilns, openings in said base plate corresponding with the lower openings of the kilns in the heat-treatment stations and in the drawing station and grates in said openings in the heat-treatment stations, means for causing combustion air and produced waste gases to flow through all the kilns in the heat treatment stations in the same direction and means for artificially cooling the grate in the station preceding the drawing station and in which the reaction zone has progressed to adjacent the bottom of the kiln.

7. An arrangement for the heat-treatment, i. e. burning, sintering, calcining and the like, of raw materials particularly cement raw material mixed with solid fuel, comprising several stationary vertical kilns of a height not exceeding about 4 metres and intended to be loaded with shapes, briquettes or granules of a small size (as specified), the heat-treatment of which is started in timed relationship at the top of the kilns and progresses downwardly until the reaction zone reaches the bottom of the respective kiln, a moveable loading device, a moveable ignition device, a moveable drawing device, and means adapted to move said loading device, said ignition device and said drawing device stepwise from one kiln to the next following kiln.

8. An arrangement for the heat-treatment, i. e. burning, sintering, calcining and the like, of raw materials particularly cement raw material mixed with solid fuel, comprising several stationary vertical kilns of a height not exceeding about 4 metres and intended to be loaded with shapes, briquettes or granules of a small size (as specified), the heat-treatment of which is started in timed relationship at the top of the kilns and progresses downwardly until the reaction zone reaches the bottom of the respective kiln, a moveable loading device, a moveable ignition device, a moveable drawing device, means adapted to move said loading device, said ignition device and said drawing device stepwise from one kiln to the next following kiln, a hinged grate pivotally mounted to the bottom of each kiln, a suction box registering with and connected to the bottom opening of each kiln, a suction pump and tubes connecting said pump to each suction box, and a hinged gate provided at the bottom of each suction box.

9. An arrangement for the heat-treatment, i. e. burning, sintering, calcining and the like, of raw materials, particularly cement raw material mixed with solid fuel, comprising several stationary vertical kilns of a height not exceeding about 4 metres and intended to be loaded with shapes, briquettes or granules of a small size (as specified), the heat-treatment of which is started in timed relationship at the top of the kilns and progresses downwardly until the reaction zone reaches the bottom of the respective kiln, said stationary kilns being arranged in a circle, a centrally arranged hopper for the raw material to be treated, and a loading device comprising a conveyor adapted to receive the raw material from said central hopper and to convey the material to said peripherally arranged kilns, said conveyor being rotatably mounted around the axis of the kiln circle and adapted to be rotated stepwise from one kiln to the next following kiln.

10. An arrangement for the heat-treatment, i. e. burning, sintering, calcining and the like, of raw materials, particularly cement raw material mixed with solid fuel, comprising several stationary vertical kilns of a height not exceeding about 4 metres and intended to be loaded with shapes, briquettes or granules of a small size (as specified), the heat-treatment of which is started in timed relationship at the top of the kilns and progresses downwardly until the reaction zone reaches the bottom of the respective kiln, a moveable loading device, a moveable ignition device, a moveable drawing device, means adapted to move said loading device, said ignition device and said drawing device stepwise from one kiln to the next following kiln, a hinged grate pivotally mounted to the bottom of each kiln, a suction box registering with and connected to the bottom opening of each kiln, a suction pump and tubes connecting said pump to each suction box, a hinged gate provided at the bottom of each suction box, said drawing device comprising an annular disc extending and revolving underneath said hinged gate of said suction boxes, conveying means, and a scraper adapted to remove the material from said annular disc and to discharge it onto said conveying means.

11. An arrangement for the heat-treatment, e. g. burning, sintering, calcining and the like, of materials, such as cement raw material mixed with solid fuel, comprising in successive stations including a plurality of heat-treatment stations three or more vertical kilns in which the charge is stationary during the heat-treatment, means at one of the stations for loading the material to be treated into said kilns, means for operating said kilns in succession so that, when one kiln is loaded, the heat-treating process is started at and progresses from one vertical end of the kiln in a first heat-treatment station in a vertical direction towards the vertically opposite end of the kiln, and progresses further vertically in the kiln or kilns in the following heat-treatment stations until the reaction zone reaches the vertically opposite end of the kiln in the last heat-treatment station, means for discharging the treated material, means causing the combustion air and the produced waste gases to flow through all the kilns of the heat-treatment stations in the same direction which coincides with the direction of the vertical progress of the heat-treatment in said kilns and means interconnecting the said opposite end of the kiln in said last heat-treatment station and the end of the kiln at which the heat-treatment process is started in said first heat-treatment station for transferring the hot air or waste gases leaving the reaction zone of the kiln in the last heat-treatment station at substantially the high temperature level obtained in said last heat-treatment station to the vertical end through which the gases enter the kiln in the first heat-treatment station.

12. An arrangement according to claim 11, in which the individual kilns have a height of the order of about 1½ to 4 meters.

13. An arrangement according to claim 11, in which the kilns are open at the top and provided with discharge openings at the bottom.

14. An arrangement for the heat-treatment, e. g. burning, sintering, calcining and the like, of materials, such as cement raw material mixed with solid fuel, comprising drawing and loading and two or more heat treatment stations arranged in a circle, in each station a vertical kiln in which the charge is stationary during the heat-treatment, said kilns being adapted to be moved in succession from one station to the next following station, means for operating said kilns in succession so that, when one kiln is loaded, the heat-treating process is started at the top of and progresses downwardly in the kiln in the next following heat-treatment station, and progresses further downwardly in the kiln or kilns in the following stations until the hot reaction zone reaches the bottom of the kiln in the last heat-treatment station, means causing the combustion air and the produced waste gases to flow through all the kilns in a downward direction and means interconnecting the bottom and top ends of the kilns in the respective last and first heat-treatment stations only for transferring the hot air or the waste gases, leaving the reaction zone of the kiln in the last heat-treatment station, at substantially the high temperature level obtained in said last heat-treatment station to an opening through which the gases enter the kiln in the first heat-treatment station.

15. An arrangement for the heat-treatment, e. g. burning, sintering, calcining and the like, of materials, such as cement raw material mixed with solid fuel, comprising a plurality of working stations including two or more heat-treatment stations, a drawing station and a loading station arranged in a circle, in each working station a vertical kiln open at the top and provided with a discharge opening at the bottom, the charge in the kilns being stationary during the heat-treatment which is started at one end of the kilns and progresses therethrough in a vertical direction towards the vertically opposite end, said kilns being adapted to be moved in succession from one working station to the next following working station, means for operating said kilns in succession so that, when one kiln is discharged or loaded the heat-treating process is started and progresses in the kiln in the next following heat-treatment station, and progresses further in the kiln or kilns in the following heat-treatment stations until the reaction zone reaches said vertically opposite end of the kiln in the last heat-treatment station, means causing the combustion air and the produced waste gases to flow through all the kilns in the direction from the end at which the heat-treatment process is started to said vertically opposite end and means interconnecting opposite ends of the kilns in the respective last and first heat-treatment stations such as to transfer the hot air or the waste gases, leaving the reaction zone of the kiln in the last heat-treatment station, at substantially the high temperature level obtained in said last heat-treatment station to the opening through which the gases enter the kiln in the first heat-treatment station.

16. An arrangement for the heat-treatment, e. g. burning, sintering, calcining and the like, of materials, such as cement raw material mixed with solid fuel, comprising two or more heat-treatment stations and a drawing and a loading station arranged in a circle, in each station a vertical kiln open at the top and provided with a discharge opening at the bottom, the charge in the kiln being stationary during the heat treatment, said kilns being adapted to be moved in succession from one working station to the next following working station, means for operating said kilns in succession so that, when one kiln is discharged or loaded, the heat-treatment process is started at the upper end of and progresses downwardly in the kiln in the next following heat-treatment station, and progresses further downwardly in the kiln or kilns in the following stations until the reaction zone reaches the bottom of the kiln in the last heat-treatment station, grates and suction boxes arranged at the heat-treatment stations and adapted to register with the bottom opening of the kilns for causing the air and produced waste gases to be drawn through all the kilns in a downward direction, and conduit means interconnecting the suction box of only the last heat-treatment station where the reaction zone reaches the bottom of the kiln and the upper end of the kiln in the first heat-treatment station.

17. An arrangement for the heat-treatment, according to claim 16, wherein the conduit means interconnecting the suction box of the last heat-treatment station and the upper end of the kiln in the first heat-treatment station, so that first hot waste gases and then heated air is drawn through the material in said first heat-treatment station, includes an enlarged end section bent downwards to form a hood registering with the upper end opening of the kiln in said first heat-treatment station.

18. An arrangement for the heat-treatment, according to claim 16, in which a fuel burner is arranged in the conduit means connected to the upper end of the first heat-treatment station in a position adjacent said upper end.

19. An arrangement for the heat-treatment, e. g. burning, sintering, calcining and the like, of materials, such as cement raw material mixed with solid fuel, comprising a plurality of working stations including two or more heat-treatment stations and a drawing station and a loading station arranged in a circle, in each station a vertical kiln which is open at the top and provided with a discharge opening at the bottom and in which the charge is stationary during the heat-treatment, a structure wherein the kilns are suspended and which is adapted to move the kilns stepwise through the different working stations, means for operating said kilns in succession so that, when one kiln is discharged or loaded, the heat-treatment process is started at the top end of and progresses downwardly in the kiln in the next following heat-treatment station, and progresses further downwardly in the kiln or kilns in the next following stations until the reaction zone reaches the bottom of the kiln in the last heat-treatment station, means causing the combustion air and the produced waste gases to flow through all the kilns in a downward direction, and a conduit connected between the bottom end of the kiln in the last heat-treatment station and the top end of the kiln in the first heat-treatment station for passing the air and waste gases from the reaction zone of the kiln in the last heat-treatment station at substantially the high temperature level obtained in said last heat-treatment station to the kiln in the first heat-treatment station.

20. An arrangement for the heat-treatment, according to claim 19, in which a circular stationary base plate is arranged close underneath the suspended kilns, which plate is provided in the heat-treatment stations and in the drawing station with openings adapted to register with the bottom ends of said suspended kilns.

21. An arrangement for the heat-treatment, according to claim 19, in which a circular stationary base plate is arranged close underneath the open bottom of the suspended kilns, and provided in the heat-treatment stations and in the drawing station with openings adapted to register with the bottom ends of said suspended kilns, said openings in the base plate in the heat-treatment stations being provided with grates adapted to support the material in the kilns and allowing air to be drawn through the material.

22. An arrangement for the heat-treatment, according to claim 19, comprising additionally a circular stationary base plate arranged close underneath the open bottom of the suspended kilns, which plate is provided in the heat-treatment stations and in the drawing station with openings adapted to register with the bottom ends of said suspended kilns, grates in said openings, in the heat-treatment stations, adapted to support the material in the kilns and allowing air to be drawn through the material, and a ring surrounding each kiln at the bottom end thereof, said ring being arranged for free gliding movement on the surface of the kiln in an axial direction and is provided with a flange facing said base plate so that it rests on the base plate and glides along it when the kilns are moved from one station into the next following station, thus forming a seal between the lower openings of the kilns and the base plate.

23. An arrangement for the heat-treatment, e. g. burning, sintering, calcining and the like, of materials, such as cement raw material mixed with solid fuel, comprising a plurality of heat-treatment stations and separate loading and drawing stations arranged in a horizontally arranged circle, in each station a kiln which is provided with an open upper end and with an open lower end and in which the charge is stationary during the heat-treatment which is started at the upper end and progresses downwardly through the kiln until the reaction zone finally reaches the bottom end thereof, a structure wherein the kilns are suspended and which is adapted to move the kilns stepwise through the stations, means allowing operation of said kilns with displaced phases so that, when one kiln is loaded, the heat-treatment process is started and progresses downwardly in the kiln in the next following station, and progresses further downwardly in the kiln or kilns in the next following stations until it reaches the bottom of the kiln in the last station, means causing the combustion air and the produced waste gases to flow through all of the kilns in a downward direction, a ring-shaped stationary base plate arranged close underneath the open lower ends of the circularly arranged kilns and provided in the heat-treatment stations and in the drawing station with openings adapted to register with said open ends of said suspended kilns, and with grates in the said openings in the heat-treatment stations adapted to support the material in the kilns and allowing air to be drawn through the material, and a conduit connecting a suction box below the last heat-treatment station in which the reaction zone reaches the bottom of the kiln and the upper end of the kiln in the station where the heat-treatment is started, said conduit being arranged to extend through the open center of said circular base plate.

24. An arrangement for the heat-treatment, e. g. burning, sintering, calcining and the like, of materials, such as cement raw material mixed with solid fuel, comprising in successive stations three or more stationary kilns in which the charge is stationary during the heat-treatment, means for operating said kilns in succession so that, when one kiln is loaded, the heat-treatment process is started at the upper end of and progresses downwardly in the kiln in the next following station, and progresses further downwardly in the kiln or kilns in the following stations until the reaction zone reaches the bottom of the kiln in the last heat-treatment station, and means causing the combustion air and the produced waste gases to flow through all the kilns in a downward direction, a suction box located underneath each kiln and provided with a gate for the discharge of the treated material, each kiln being provided with an open upper end and a movable grate at its lower end, which grate is adapted to allow discharge of the treated material from the lower end of the kiln into the associated suction box and a movable loading device arranged above the kilns which is adapted to move stepwise from one kiln to the next following kiln, and means movable with said loading device for transferring the air or the waste gases leaving the reaction zone of the kiln in the last heat-treatment station to the upper end of the kiln in the station in which the loading has just been completed.

FRANCIS PAUL SOMOGYI.

References Cited in the file of this patent

UNITED STATES PATENTS

| Number | Name | Date |
|---|---|---|
| 1,122,879 | Drayton | Dec. 29, 1914 |
| 1,315,952 | Dwight et al. | Sept. 16, 1919 |
| 1,433,354 | Dwight | Oct. 24, 1922 |
| 1,687,563 | Honigmann et al. | Oct. 16, 1928 |

FOREIGN PATENTS

| Number | Country | Date |
|---|---|---|
| 5,248/26 | Australia | Dec. 31, 1927 |